US012563284B2

(12) United States Patent
Kaiser et al.

(10) Patent No.: US 12,563,284 B2
(45) Date of Patent: Feb. 24, 2026

(54) OFFSETTING CAMERA FILTER SHIFT

(71) Applicant: Adobe Inc., San Jose, CA (US)

(72) Inventors: Adrien Michel Paul Kaiser, Lyons (FR); Yannick Hold-Geoffroy, Quebec (CA); Valentin Mathieu Deschaintre, London (GB); Jerome Eric Christophe Derel, Hauts-de-seine (FR); Adel Bennaceur, Houilles (FR)

(73) Assignee: Adobe Inc., San Jose, CA (US)

( * ) Notice: Subject to any disclaimer, the term of this patent is extended or adjusted under 35 U.S.C. 154(b) by 189 days.

(21) Appl. No.: 18/443,667

(22) Filed: Feb. 16, 2024

(65) Prior Publication Data

US 2025/0267348 A1      Aug. 21, 2025

(51) Int. Cl.
H04N 23/55     (2023.01)
G06T 7/30     (2017.01)
G06T 11/60     (2006.01)

(52) U.S. Cl.
CPC .............. H04N 23/55 (2023.01); G06T 7/30 (2017.01); G06T 11/60 (2013.01)

(58) Field of Classification Search
CPC ...... H04N 23/55; H04N 13/0434; G06T 7/30; G06T 11/60; G02B 27/26; G02B 5/20; G03B 35/26
See application file for complete search history.

(56) References Cited

U.S. PATENT DOCUMENTS

| | | | | | |
|---|---|---|---|---|---|
| 6,028,303 A | * | 2/2000 | Suzuki | ................... | G03B 11/00 |
| | | | | | 359/488.01 |
| 2007/0280669 A1 | * | 12/2007 | Karim | .................... | G03B 15/03 |
| | | | | | 396/155 |
| 2008/0252882 A1 | * | 10/2008 | Kesterson | .............. | G02B 27/28 |
| | | | | | 356/300 |
| 2009/0244355 A1 | * | 10/2009 | Horie | ....................... | G02B 5/22 |
| | | | | | 359/578 |
| 2010/0128164 A1 | * | 5/2010 | Petljanski | ................ | G02B 5/20 |
| | | | | | 348/360 |
| 2010/0157082 A1 | * | 6/2010 | Katerberg | .............. | G03B 17/14 |
| | | | | | 348/222.1 |
| 2020/0092482 A1 | * | 3/2020 | Tsuruyama | ............... | G06T 5/73 |
| 2020/0183066 A1 | * | 6/2020 | Mitani | ..................... | G03B 5/00 |

* cited by examiner

*Primary Examiner* — Abdelaaziz Tissire
(74) *Attorney, Agent, or Firm* — FIG. 1 Patents

(57) ABSTRACT

In implementation of techniques for offsetting camera filter shift, a computing device implements an offset system to capture a first digital image using a filter at a first position relative to an image capture device and to capture a second digital image using the filter at a second position relative to the image capture device resulting from movement of the filter between the first position and the second position. The offset system determines a filter shift resulting from the movement by comparing the first and second digital images. The offset system then controls an offset of a portion of the image capture device based on the filter shift.

20 Claims, 10 Drawing Sheets

100

Image Capture Device 112

118

114        114        120        114        120

124        126        130

Input 122

Reference Digital Image 124

Additional Digital Image 126

Computing Device 102

Image Processing System 104

Offset Module 116

Output 128

Offset 118

108

Digital Content 106

Network 110

200

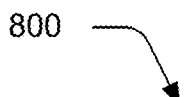

800

---

802
Capture a first digital image using a filter at a first position relative to an image capture device

⬇

804
Capture a second digital image using the filter at a second position relative to the image capture device resulting from movement of the filter between the first position and the second position

⬇

806
Determine a filter shift resulting from the movement by comparing the first and second digital images

⬇

808
Control an offset of a portion of the image capture device based on the filter shift

Fig. 8

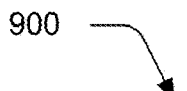

900

---

902
Generate a model comparing a first digital image captured using a filter at a first position relative to an image capture device to a second digital image captured using the filter at a second position relative to the image capture device resulting from a movement of the filter between the first position and the second position

---

904
Extract pixel coordinates and sensor coordinates from the model

---

906
Determine a filter shift resulting from the movement based on the pixel coordinates and the sensor coordinates

---

908
Determine an offset of a portion of the image capture device to correct the filter shift

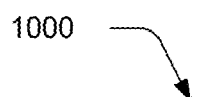
1000
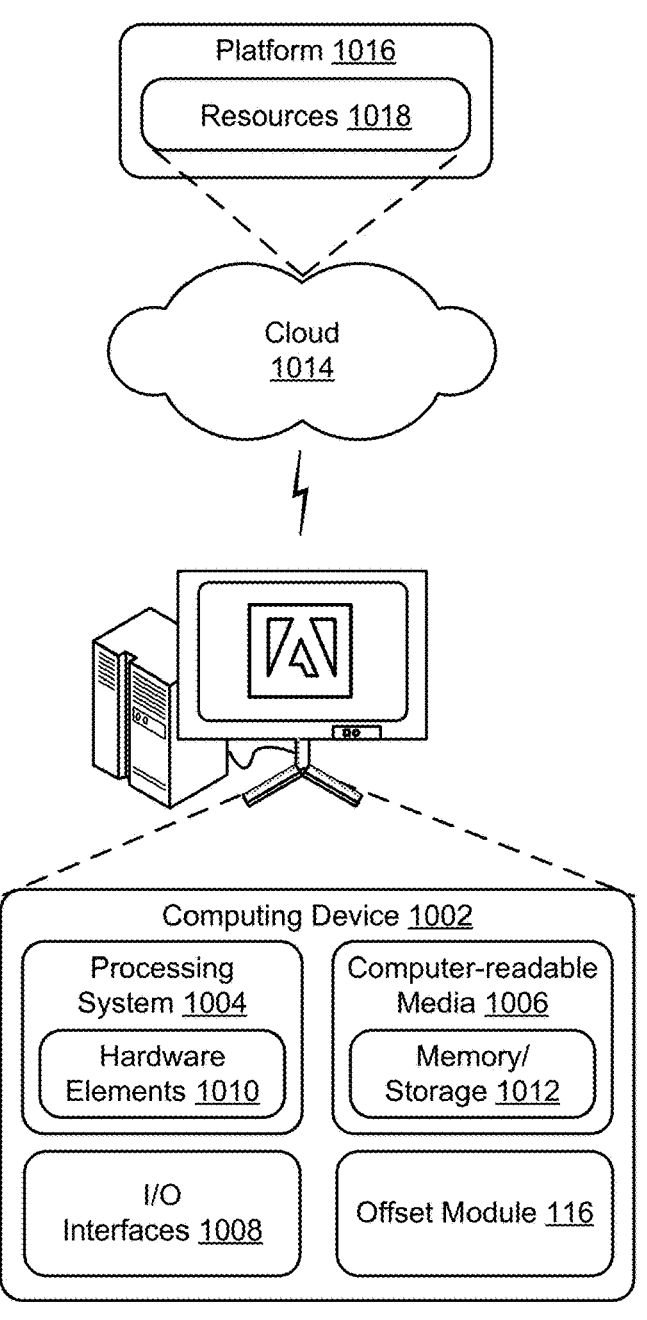
Platform 1016
Resources 1018
Cloud
1014
Computing Device 1002
Processing
System 1004
Hardware
Elements 1010
Computer-readable
Media 1006
Memory/
Storage 1012
I/O
Interfaces 1008
Offset Module 116
Fig. 10

OFFSETTING CAMERA FILTER SHIFT

BACKGROUND

A polarization filter is an optical device attached to a camera lens that is used to control and manipulate directions of polarized light entering the camera lens. Polarization refers to an orientation of oscillations of light waves. The polarization filter allows light waves vibrating in a specific direction to pass through the polarization filter, while blocking or reducing intensity of light waves vibrating in other directions. Polarization filters are used by photographers to reduce glare from reflective surfaces, including water, glass, or shiny objects. By selectively blocking horizontally polarized light, polarization filters enhance contrast and improve visibility in digital images. However, errors occur when using polarization filters that result in visual inaccuracies in real world scenarios.

SUMMARY

Techniques and systems for offsetting camera filter shift are described. In an example, an offset system captures a first digital image using a filter at a first position relative to an image capture device. The offset system also captures a second digital image using the filter at a second position relative to the image capture device resulting from movement of the filter between the first position and the second position.

By comparing the first and second digital images, the offset system determines a filter shift resulting from the movement by generating a transformation relating the first digital image to the second digital image using an algorithm designed to register images captured under varying lighting conditions. The offset system extracts pixel coordinates and sensor coordinates from the transformation.

Based on the filter shift, the offset system controls an offset of a portion of the image capture device using an Optical Image Stabilizer (OIS). Some examples further comprise capturing an offset digital image based on the offset of the portion of the image capture device and generating at least one physically-based rendering (PBR) map based on the offset digital image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 8 depicts a procedure in an example implementation of offsetting camera filter shift.

FIG. 9 depicts a procedure in an additional example implementation of offsetting camera filter shift.

FIG. 10 illustrates an example system including various components of an example device that can be implemented as any type of computing device as described and/or utilized with reference to FIGS. 1-9 to implement embodiments of the techniques described herein.

DETAILED DESCRIPTION

Overview

Figure 1:
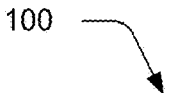
FIG. 1 is an illustration of a digital medium environment in an example implementation that is operable to employ techniques and systems for offsetting camera filter shift as described herein.

Digital cameras include a polarization filter to reduce glare entering a camera lens. The polarization filter is attached in a coplanar configuration outside of the lens, which allows light waves vibrating in one direction to pass through to the lens, while blocking or reducing intensity of light waves vibrating in other directions. For example, by selectively blocking horizontally polarized light, polarization filters enhance contrast and improve visibility. Photographers capture digital images at different polarization states by rotating the polarization filter using a motor to allow different directions of light waves to enter the lens. Because the polarization filter is not a fixed part of the camera, however, the polarization filter tilts when rotating, introducing misalignment between the polarization filter and the camera lens or sensor, resulting in blurry images. This is especially problematic when capturing high-resolution digital images to generate physically-based rendering (PBR) maps.

Conventional digital editing techniques exist that attempt to correct image alignment during post-processing. However, these conventional techniques are computationally heavy because calculations are performed using software on a pixel-by-pixel basis, resulting in slow processing time. These conventional techniques also do not correct camera hardware and therefore cannot prevent misalignment of digital images captured in the future.

Techniques and systems are described for offsetting camera filter shift that overcome these limitations by physically offsetting a portion of the camera to correct for filter shift using an Optical Image Stabilizer (OIS). The OIS is a mechanism equipped in cameras to stabilize instrument shaking and controls offset of portions of the camera, including the camera lens and sensor.

To determine the filter shift and how much offset for the OIS to apply to the camera lens or sensor, an offset system begins by capturing a reference digital image at a first polarization state, meaning the polarization filter is positioned at a first position relative to the camera lens. The offset system also captures an additional digital image at a second polarization state by rotating the polarization filter to a second position using a motor.

Using the reference digital image and the additional digital image, the offset system uses an algorithm to generate a transformation relating the reference digital image to the additional digital image. The offset system extracts translation components from the transformation, including pixel coordinates and sensor coordinates. Using a predefined mapping scheme, the offset system determines the filter shift for the second polarization state by mapping the pixel coordinates to the sensor coordinates. The filter shift indicates a location and amount of misalignment between the filter and the camera lens.

The offset system then uses the OIS to rectify misalignment for the second polarization state caused by rotation of the polarization filter by physically applying an offset corresponding to the filer shift to the camera lens or sensor. This results in alignment between the sensor, the lens, and the polarization filter for subsequent digital images captured at the second polarization state. The process is repeated when the polarization filter is rotated again to capture digital images at a different polarization state.

Offsetting camera filter shift in this manner overcomes the disadvantages of conventional digital editing techniques that are limited to using software to edit digital images on a pixel-by-pixel basis during post-processing. For example, physically offsetting a portion of the camera for a given polarization state results in alignment for subsequent digital images captured at that polarization state, without individually editing image alignment. For these reasons, offsetting camera filter shift is faster and uses fewer resources than conventional digital editing techniques.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques and systems for offsetting camera filter shift described herein. The illustrated digital medium environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), an augmented reality device, and so forth. Thus, the computing device 102 ranges from full resource devices with substantial memory and processor resources (e.g., personal computers, game consoles) to a low-resource device with limited memory and/or processing resources, e.g., mobile devices. Additionally, although a single computing device 102 is shown, the computing device 102 is also representative of a plurality of different devices, such as multiple servers utilized by a business to perform operations "over the cloud" as described in FIG. 10.

The computing device 102 also includes an image processing system 104. The image processing system 104 is implemented at least partially in hardware of the computing device 102 to process and represent digital content 106, which is illustrated as maintained in storage 108 of the computing device 102. Such processing includes creation of the digital content 106, representation of the digital content 106, modification of the digital content 106, and rendering of the digital content 106 for display in a user interface for output, e.g., by a display device. Although illustrated as implemented locally at the computing device 102, functionality of the image processing system 104 is also configurable entirely or partially via functionality available via the network 110, such as part of a web service or "in the cloud."

The computing device 102 is associated with an image capture device 112. In some examples, the image capture device 112 is a digital camera designed for capturing still digital images, including point-and-shoot cameras, mirrorless cameras, and digital single-lens reflex (DSLR) cameras. In other examples, the image capture device 112 is a smartphone camera or other mobile device camera. The image capture device 112 is equipped with a filter 114 that filters angles of light or amounts of light that enter a lens of the image capture device 112. An example of the filter 114 is a polarization filter, which is an optical device used in photography and other imaging applications to control and reduce glare, reflections, and unwanted light. In this example, the filter 114 is rotated to adjust angles of light entering the lens of the image capture device 112. However, rotating the filter 114 introduces shift between the filter 114 and the lens of the image capture device 112.

The computing device 102 also includes an offset module 116 which is illustrated as incorporated by the image processing system 104 to determine an offset 118 to a component of the image capture device 112 to compensate for a filter shift 120 in the x or y axes caused by rotating the filter 114. For example, the offset module 116 first receives an input 122 including a reference digital image 124 captured by the image capture device 112 using the filter 114 at a first position and an additional digital image 126 captured by the image capture device 112 using the filter 114 rotated to a second position. The filter 114 at the first position captures images at a first polarization state, and the filter 114 at the second position captures images at a second polarization state, filtering different angles of light from entering the lens of the image capture device 112 than the first polarization state. In this example, images captured at the second polarization state appear darker than images captured at the first polarization state because the filter 114 at the second position allows a different amount of light to reach the lens of the image capture device 112. Because the filter shift 120 occurs while rotating the filter 114, the additional digital image 126 depicts content that is blurry or skewed compared to the reference digital image 124.

Based on the reference digital image 124 and the additional digital image 126, the offset module 116 determines an offset 118 to physically adjust an Optical Image Stabilizer (OIS), which is incorporated into the lens or image sensor of the image capture device 112 to stabilize instrument shaking. To determine the offset 118, the offset module 116 uses an algorithm to generate a transformation relating the reference digital image 124 to the additional digital image 126. Translation components are extracted from the transformation, including pixel coordinates and sensor coordinates. The offset module 116 determines the filter shift 120 from by mapping the pixel coordinates to the sensor coordinates using a predefined mapping mechanism. The filter shift 120 indicates how much the filter 114 is shifted from alignment with the lens of the image capture device 112. Based on the filter shift 120 the offset module 116 determines an offset 118 to adjust the lens or the sensor of the image capture device 112.

The offset module 116 then uses the OIS physically adjust the lens or the sensor of the image capture device 112 in the x or y axes to rectify the filter shift 120 caused by the rotation of the filter 114. Additionally or alternatively, the OIS physically adjusts the lens or the sensor in the z axis or in terms or angular rotation. This ensures that subsequent images captured at the second polarization state are aligned. For example, an offset digital image 130 is captured using the filter 114 at the second position and the offset 118 to the lens or sensor applied by OIS. Because the offset 118 by the OIS compensates for the filter shift 120, misalignment between the image capture device 112 and the filter 114 is minimized, producing an offset digital image 130 that is sharp and clear.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Offsetting Camera Filter Shift

Figure 2:
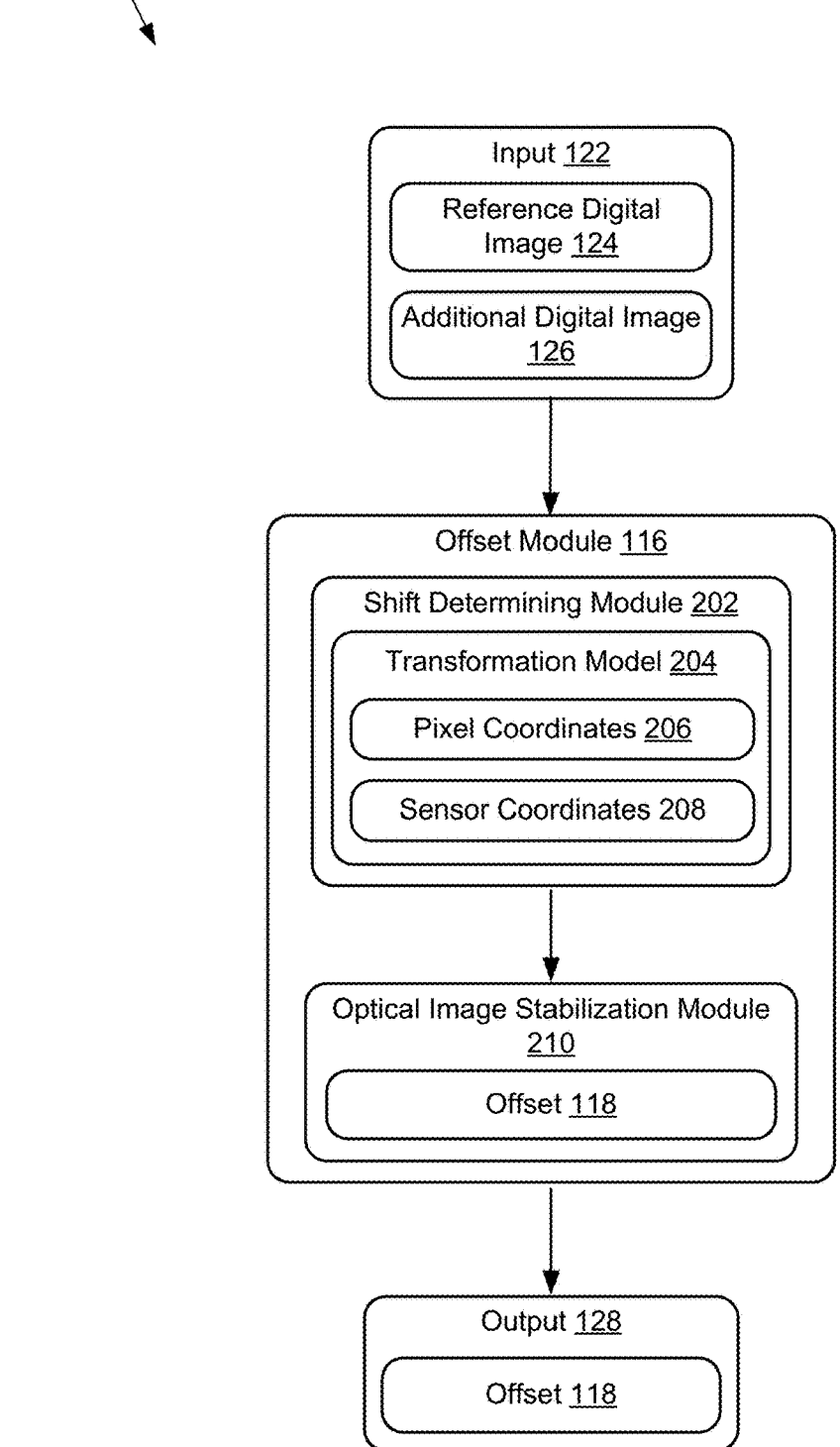
FIG. 2 depicts a system in an example implementation showing operation of an offset module for offsetting camera filter shift.

FIG. 2 depicts a system 200 in an example implementation showing operation of the offset module 116 of FIG. 1 in greater detail. The following discussion describes techniques that are implementable utilizing the previously described systems and devices. Aspects of each of the procedures are implemented in hardware, firmware, software, or a combination thereof. The procedures are shown as a set of blocks that specify operations performed and/or caused by one or more devices and are not necessarily limited to the orders shown for performing the operations by the respective blocks. In portions of the following discussion, reference is made to FIGS. 1-10.

To begin in this example, an offset module 116 receives an input 122 including a reference digital image 124 and an additional digital image 126. The reference digital image 124 and the additional digital image 126 are captured by rotating a filter 114 to different angles relative to a lens of the image capture device 112. For example, the reference digital image 124 and the additional digital image 126 are captured by a user manually rotating the filter 114 or are captured automatically by the offset module 116. The filter 114 at a first position captures the reference digital image 124 at a first polarization state, and the filter 114 at a second position captures the additional digital image 126 at a second polarization state, filtering different angles of light from entering the lens of the image capture device 112 than the first polarization state. The filter shift 120 occurs while rotating the filter 114, resulting the additional digital image 126 depicting content that is blurry or skewed compared to the reference digital image 124.

The offset module 116 includes a shift determining module 202. The shift determining module 202 generates a transformation model 204 by comparing the reference digital image 124 to the additional digital image 126. The transformation model 204 describes differences between the reference digital image 124 and the additional digital image 126, indicating pixel coordinates 206 and sensor coordinates 208. The shift determining module 202 then extracts the pixel coordinates 206 and the sensor coordinates 208 from the transformation model 204. Based on the pixel coordinates 206 and the sensor coordinates 208, the shift determining module 202 determines the filter shift 120, which measures a misalignment between the filter 114 and the lens of the image capture device 112.

The offset module 116 also includes an optical image stabilization module 210. The optical image stabilization module 210 generates an offset 118 for application by an Optical Image Stabilizer (OIS) to a lens or a sensor of the image capture device 112. The OIS is a physical mechanism incorporated in the image capture device 112 to reduce effects of camera shake and vibrations. The OIS in some examples includes sensors to detect movement or vibration of the camera and a stabilization mechanism to compensate for unwanted movements. Additionally, the OIS includes adjustable lens elements to offset the lens or a moveable image sensor to offset the image sensor. The optical image stabilization module 210 determines an offset 118 for the OIS to adjust the lens or sensor of the image capture device 112 and generates an output 128 including the offset 118. Based on the offset, the OIS compensates for the filter shift 120 between the filter 114 and the lens of the 112 by applying the offset 118 to adjust the lens or sensor of the image capture device 112, causing the filter 114, the lens, and the sensor to be aligned for subsequent image capture.

FIGS. 3-10 depict stages of offsetting camera filter shift. In some examples, the stages depicted in these figures are performed in a different order than described below.

Figure 3:
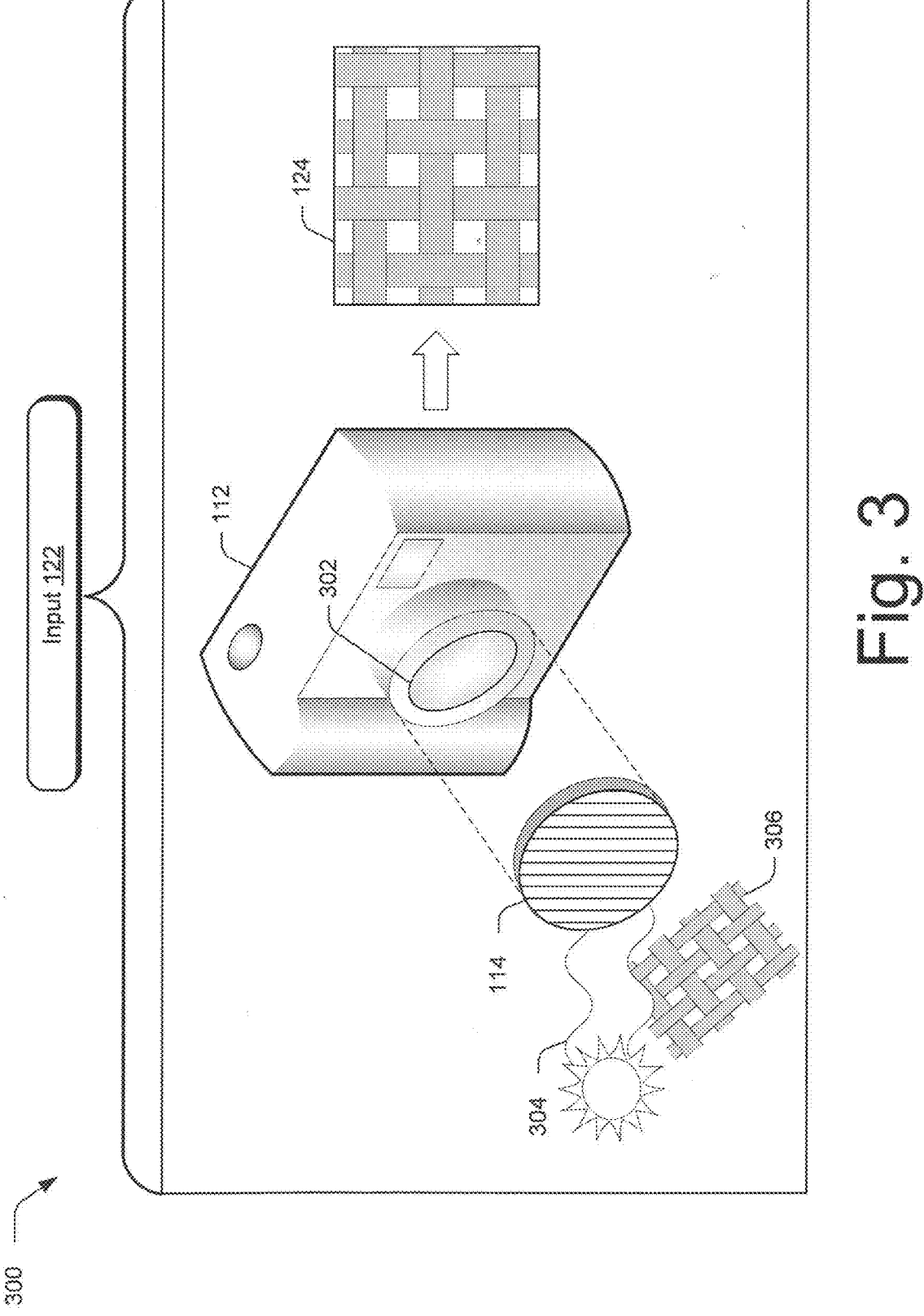
FIG. 3 depicts an example of receiving an input including a reference digital image.

FIG. 3 depicts an example 300 of receiving an input 122 including a reference digital image 124. As illustrated, the offset module 116 receives an input 122 including the reference digital image 124 that is captured by an image capture device 112 using a filter 114 mounted in front of the lens 302 of the image capture device 112. The filter 114 in this example is a polarization filter that filters angles of light 304 that enter the lens 302 as the image capture device 112 captures the reference digital image 124 depicting an image subject 306, which is a woven material in this example. The polarization filter works by selectively allowing light waves that are oscillating in a particular plane to pass through while blocking light waves oscillating in other planes, which is useful in situations where sunlight or other light sources create unwanted reflections. Polarization filters allow digital image capture at different polarization states depending on the angle of light blocked from entering the lens 302.

The filter 114 includes lines that block angles of waves of light. In this example, the filter 114 is positioned so that the lines are positioned vertically, which allow vertical oscillations of light to enter the lens 302 and block horizontal oscillations of light from entering the lens 302. The reference digital image 124 captured using the filter 114 in this first position represents a first polarization state. In some examples, the reference digital image 124 is captured under predetermined lighting conditions.

Although the image capture device 112 is depicted as a point-and-shoot digital camera in this example, other examples of the image capture device 112 include cameras incorporated into a mobile device. For example, the computing device 102 of the mobile device initiates automatic capture of the reference digital image 124 in response to receiving an indication of an upcoming filter rotation. In other examples, the reference digital image 124 is manually captured.

Figure 4:
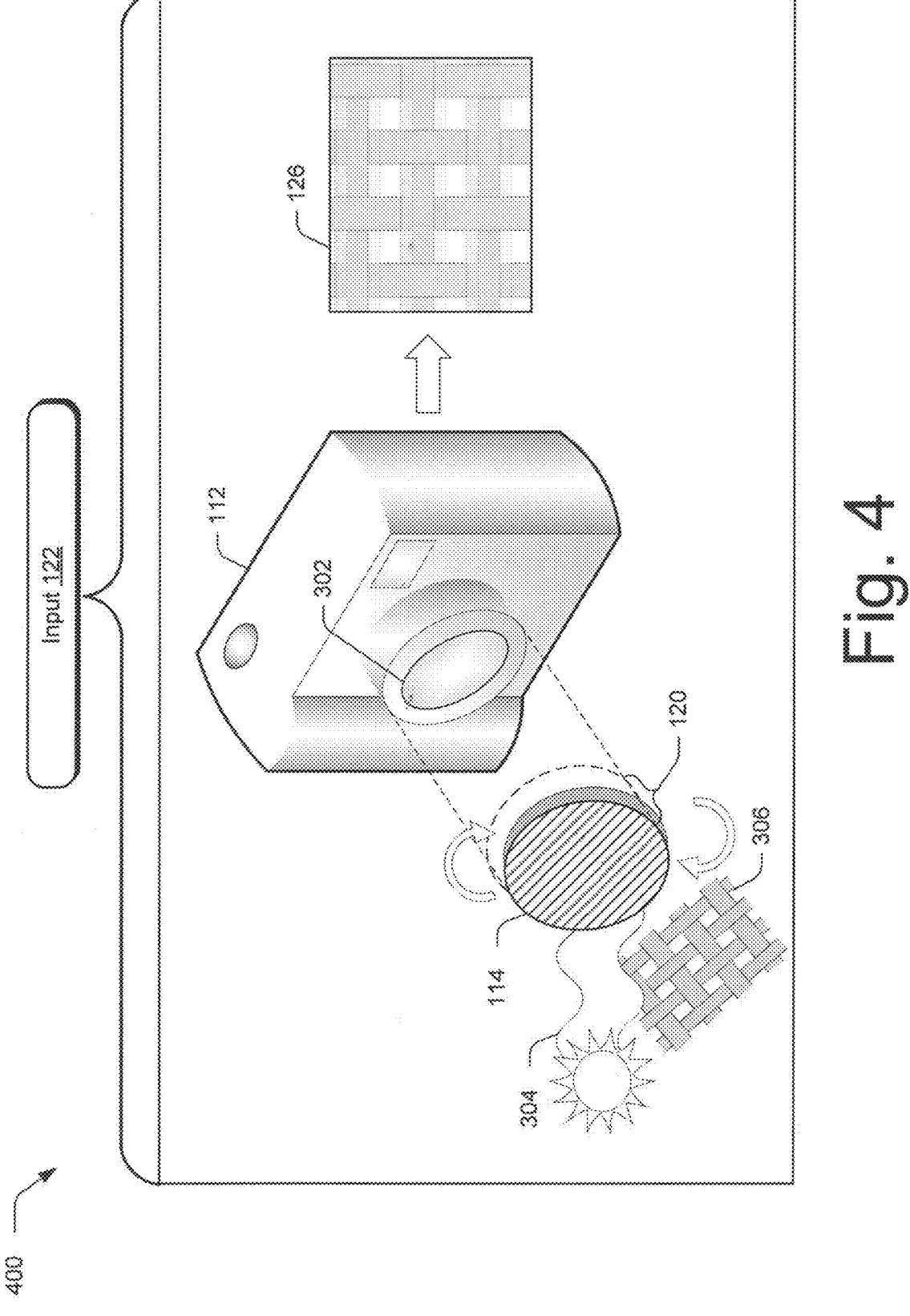
FIG. 4 depicts an example of receiving an input including an additional digital image.

FIG. 4 depicts an example 400 of receiving an input including an additional digital image 126. FIG. 4 is a continuation of the example described in FIG. 3. After the offset module 116 receives an input 122 including the reference digital image 124, the offset module 116 receives the additional digital image 126.

As illustrated, the additional digital image 126 is captured by the image capture device 112 using the filter 114 mounted in front of the lens 302 of the image capture device 112. In this example, however, the filter 114 has been rotated to a second position that is different from the first position used to capture the reference digital image 124. The filter 114 is rotated manually by a user or is rotated automatically by the offset module 116. For example, the offset module 116 receives an input including instructions to capture a digital image of a detected scene. Because the detected scene involves different lighting than a scene previously captured by the image capture device 112, the offset module 116 automatically rotates the filter 114 based on light in the detected scene.

In this example, the filter 114 has rotated so the lines are horizontal, which allows horizontal oscillations of light to enter the lens 302 and block vertical oscillations of light from entering the lens 302. The additional digital image 126 captured using the filter 114 in this second position represents a second polarization state. In some examples, the additional digital image 126 is captured under predetermined lighting conditions.

Because the filter 114 rotates and is not fixed in one position to the lens 302 of the image capture device 112, rotating the filter 114 results in a filter shift 120 between the filter 114 and the lens 302 of the image capture device 112. The filter shift 120 is a misalignment that causes a portion of the filter 114 to be closer to the lens 302 than another portion of the filter 114. In this example, the filter shift 120 occurs in the (x,y) axis. Other examples include the filter shift 120 in the x, y, and/or z axis or expressed in angular rotation coordinates. The filter shift 120 means that the filter 114 and the lens 302 are no longer coplanar, resulting in the additional digital image 126 being blurry, skewed, or out of focus.

Figure 5:
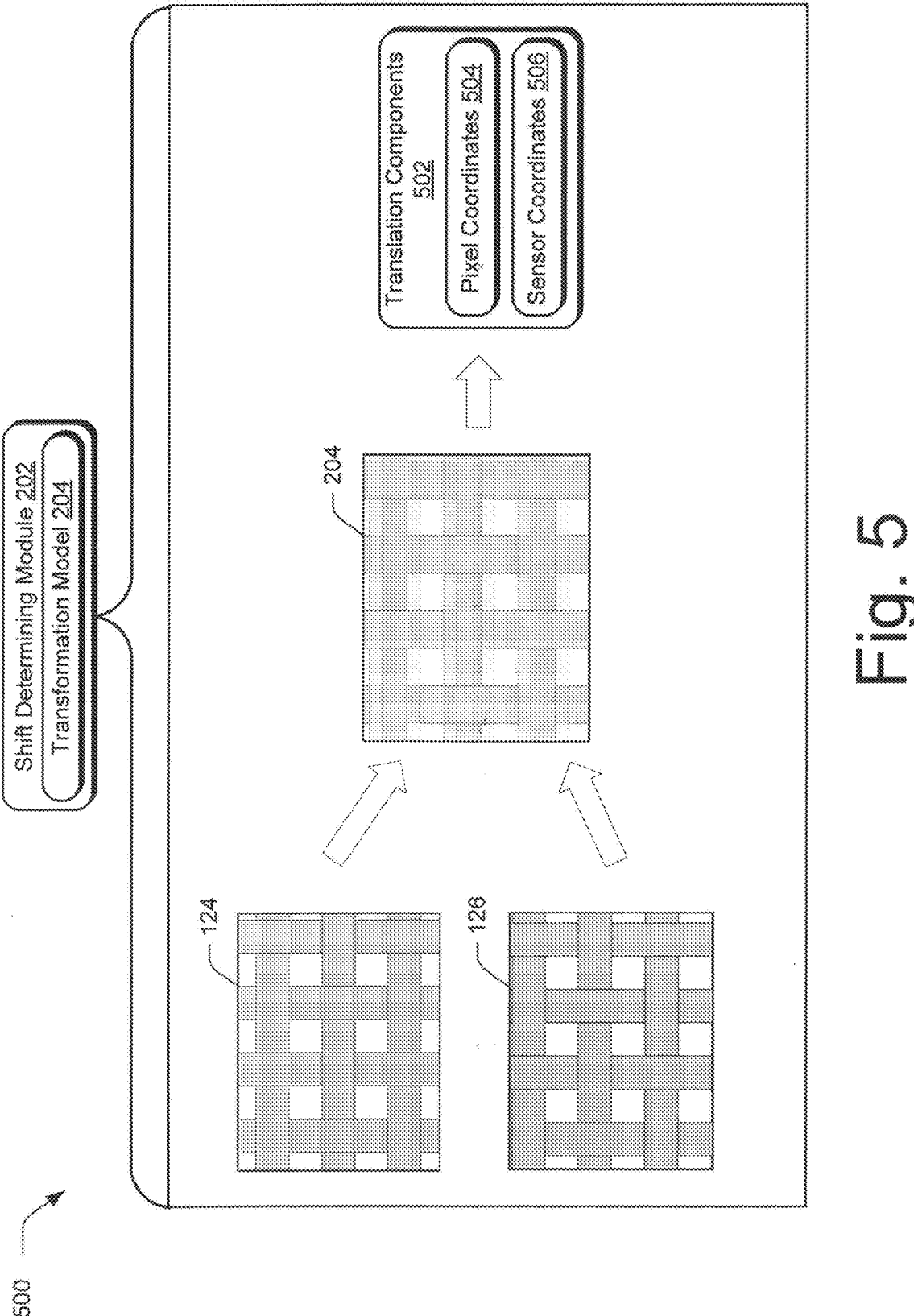
FIG. 5 depicts an example of determining a filter shift.

FIG. 5 depicts an example 500 of determining a filter shift. FIG. 5 is a continuation of the example described in FIG. 3 and FIG. 4. After the offset module 116 receives the reference digital image 124 and the additional digital image 126, the shift determining module 202 determines the filter shift 120.

To begin, the shift determining module 202 generates a transformation model 204 based on the reference digital image 124 and the additional digital image 126. The shift determining module 202 generates the transformation model 204 using an algorithm to align the reference digital image 124 with the additional digital image 126. The transformation model 204 maps translation components 502 ($T_x$, $T_y$), including pixel coordinates 504 and sensor coordinates 506 for the reference digital image 124 aligned with the additional digital image 126.

The algorithm uses mathematical and optimization techniques to achieve precise image registration for images captured under unknown, varying lighting conditions. The algorithm uses low-rank approximation and convex relaxation to address scenarios including cast shadows and specularities in digital images, which are highlights or bright, mirror-like reflections on a surface that result from direct reflection of light. Low-rank approximation is a technique used to approximate a given matrix using another matrix of lower rank. The goal of low-rank approximation is to represent the original matrix using fewer dimensions or fewer degrees of freedom while minimizing the error of the approximation. Convex relaxation is a technique used to simplify and approximate non-convex optimization problems by replacing them with convex optimization problems. In optimization, convex problems are generally easier to solve and have well-established algorithms and properties. The basic idea behind convex relaxation is to relax a non-convex optimization problem by considering a convex approximation of the original problem. This involves replacing the non-convex constraints or objective functions with convex ones, making the problem mathematically tractable.

The shift determining module 202 extracts the translation components 502 from the transformation model 204 and maps the pixel coordinates 504 to the sensor coordinates 506 using a pre-defined mapping. For example, pixels of a given scene are mapped to respective portions of a sensor, which provides the shift determining module 202 with information related to the filter shift 120 relative to an intended position for the filter 114 that is level the lens of the image capture device 112. The shift determining module 202 determines the filter shift 120 from the mapping, identifying a portion of the filter 114 that is misaligned and measuring a degree of misalignment of the filter 114.

Figure 6:
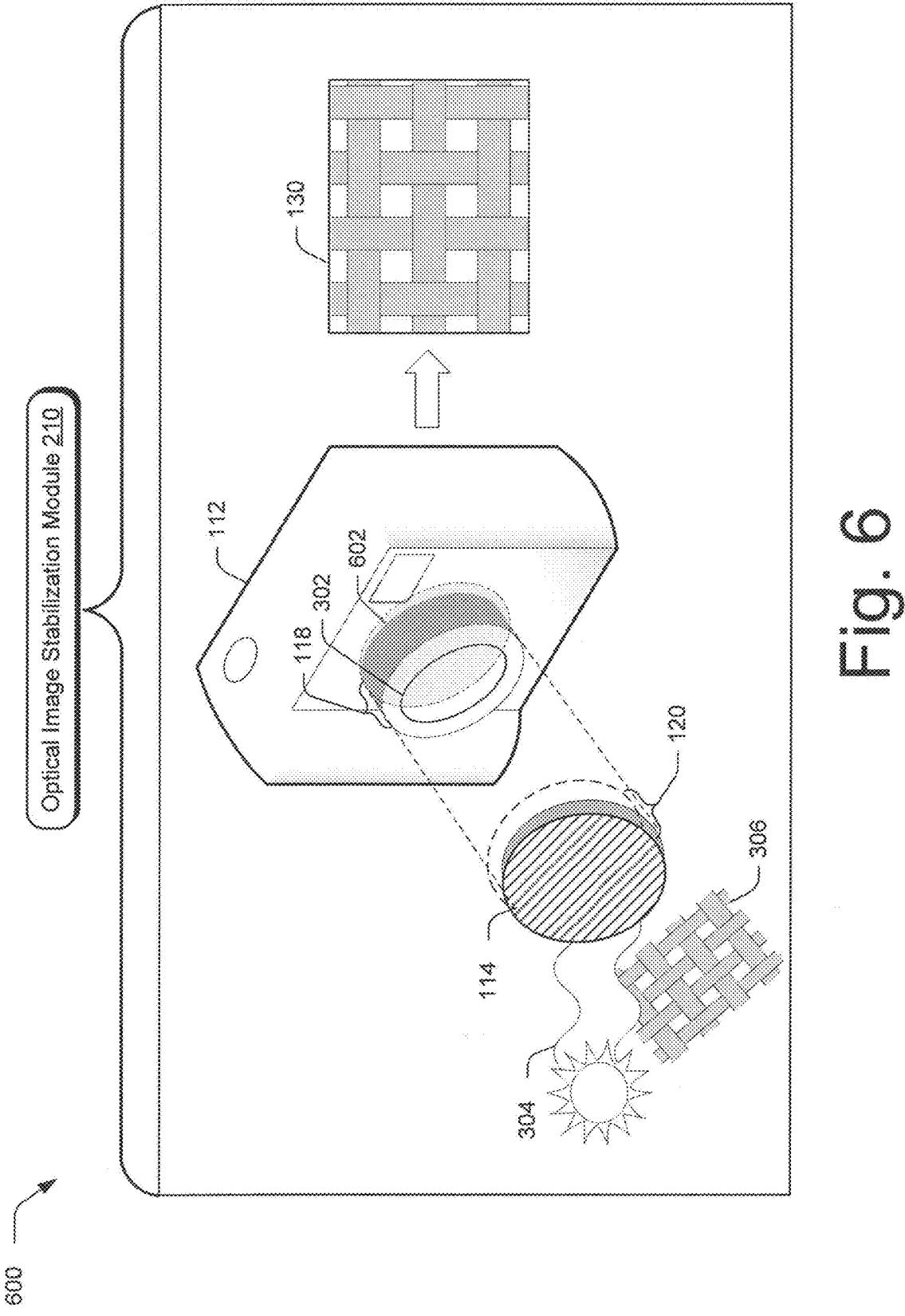
FIG. 6 depicts an example of applying an offset to the image capture device based on the filter shift.

FIG. 6 depicts an example 600 of applying an offset 118 to the image capture device 112 based on the filter shift 120. FIG. 6 is a continuation of the example described in FIG. 5. After the shift determining module 202 determines the filter shift 120 of the filter 114, the optical image stabilization module 210 applies the offset 118 to the image capture device 112 based on the filter shift 120.

The optical image stabilization module 210 aligns the filter 114 with the lens 302 or the sensor of the image capture device 112 using an Optical Image Stabilizer (OIS) 602 incorporated in the image capture device 112. The OIS 602 is a physical mechanism built into the lens 302 or image sensor of the image capture device 112 and involves, in some examples, a gyroscope or accelerometer, a stabilization mechanism, adjustable lens elements, and a moveable image sensor. In some examples, the OIS 602 incorporates sensors, including the gyroscope or the accelerometer, to detect the movement or vibration of the camera. These sensors provide real-time data about the camera's motion. Based on the information received from the sensors, the OIS 602 employs a stabilization mechanism to compensate for unwanted movements. This mechanism includes adjustable lens elements or a movable image sensor. In lens-based optical image stabilization, specific lens elements within the camera lens are shifted or adjusted to counteract the movement detected by the sensors. This helps in keeping the image stable on the camera sensor. In sensor-shift optical image stabilization, the entire image sensor moves within the camera body to compensate for shakes and vibrations. This is found in mirrorless cameras and DSLRs.

The goal of optical image stabilization is to counteract small involuntary movements that a photographer's hands introduce while holding a camera. By stabilizing the image, OIS helps in capturing sharper photos and smoother videos, especially in low-light conditions or when using telephoto lenses. The advantages of optical image stabilization include better low-light performance because the OIS 602 allows for longer exposure times without introducing motion blur, improving low-light performance. The OIS also helps to capture sharper images and videos by compensating for hand tremors or vibrations.

To determine the offset 118 to apply to the OIS, the optical image stabilization module 210 determines an updated angle, or other position to apply to either the lens 302 of the image capture device 112, the sensor of the image capture device 112, both the lens 302 and the sensor of the image capture device 112, or another component or portion of the image capture device 112.

In this example, the filter shift 120 occurs tilting the filter 114 away from a left side of the lens 302, causing misalignment. To compensate in this example, the optical image stabilization module 210 determines the offset 118 to tilt the lens 302 backward on the right side of the lens 302, away from the filter 114. The OIS 602 physically adjusts the lens 302 to implement the offset 118, resulting in realignment of the filter 114 and the lens 302.

The image capture device 112 then captures an offset digital image 130 using the lens 302 adjusted by the OIS 602 according to the offset 118. Because the filter 114 and the lens 302 are aligned, the offset digital image 130 is sharp, clear, and in-focus.

Figure 7:
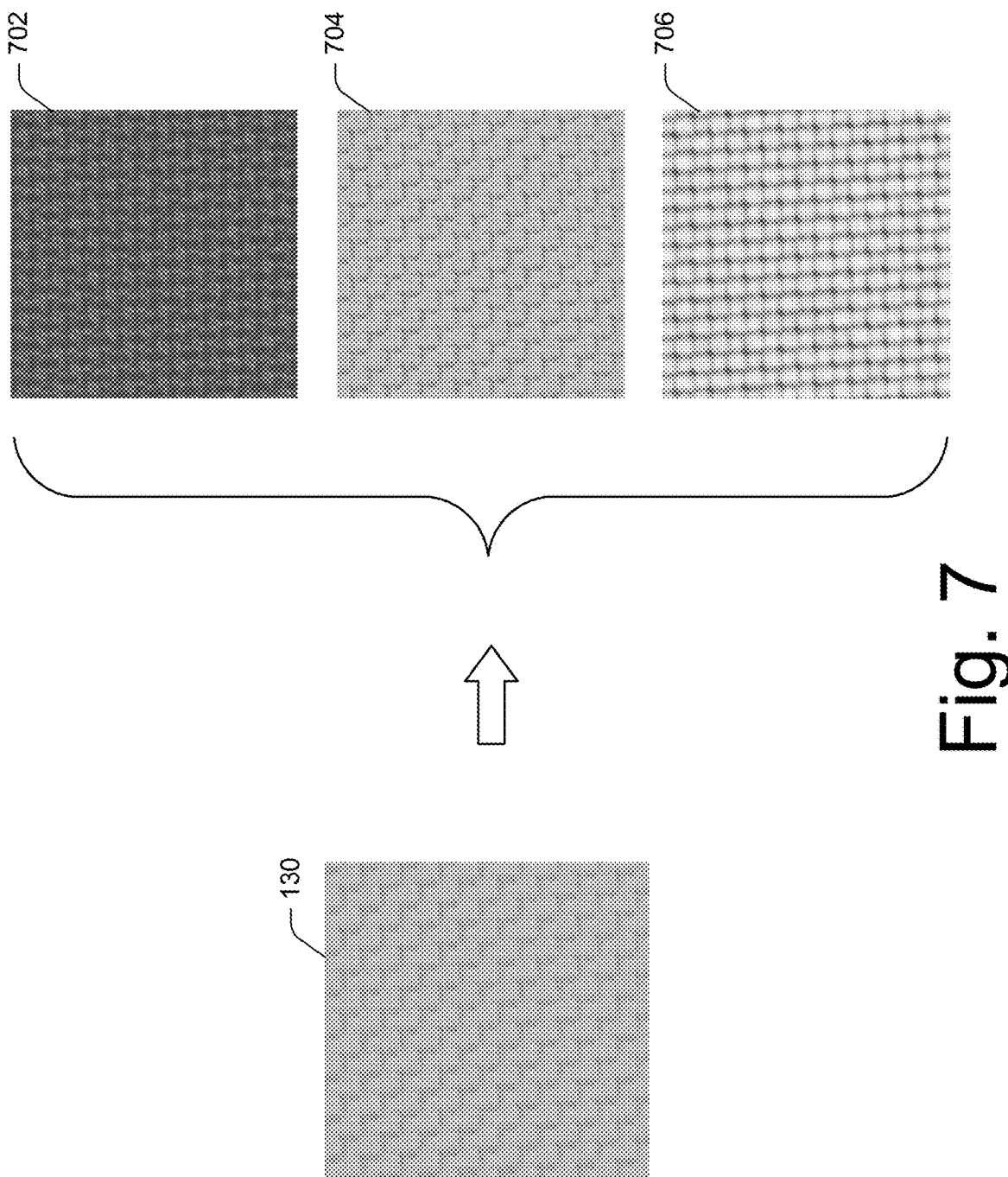
FIG. 7 depicts an example of generating physically-based rendering maps based on an offset digital image.

FIG. 7 depicts an example 700 of generating physically-based rendering maps based on an offset digital image. FIG. 7 is a continuation of the example described in FIG. 6. After the image capture device 112 captures the offset digital image 130 using the lens 302 adjusted by the OIS 602 according to the offset 118, one or more physically-based rendering (PBR) maps are generated based on the offset digital image 130.

PBR maps visually illustrate surface properties of materials captured in a digital image. As illustrated, a base color map 702 (or albedo map), a surface normal map 704 depicting fine-grain geometry, and a height map 706 depicting course-grain geometry are generated from the offset digital image 130.

The base color map 702 represents a base color of a material by defining an overall color and appearance of a surface of the material. The surface normal map 704 encodes surface normals at individual texels to simulate fine surface details and enhance a perception of geometry without adding actual geometry. The surface normal map is used to create the illusion of bumps, dents, or fine surface details. The Height map 706 encodes height information to displace the geometry of a 3D model and is used in conjunction with a displacement shader to add geometry details to the surface in some examples.

Other examples of PBR maps include a metallic map, a roughness map, an ambient occlusion map, an emissive map, a transparency map, a specular map, and a refraction map. The metallic map determines whether a material is metallic or non-metallic. In the metallic-roughness workflow, a grayscale metallic map is used, where white represents metallic areas, and black represents non-metallic areas. The roughness map defines a micro surface roughness of the material. In the metallic-roughness workflow, a grayscale roughness map is used, where white represents a smooth surface, and black represents a rough surface. The ambient occlusion map encodes information about ambient lighting conditions, emphasizing crevices and corners where light is less likely to reach. The ambient occlusion map is used to add realistic shadowing to the rendered image. The emissive map defines areas of the model that emit light and allows for surfaces to appear self-illuminated, including glow from a computer screen or a light source within the scene. The transparency map determines a transparency of different areas of a material. White areas are fully opaque, while black areas are fully transparent. The transparency map is used for materials including glass or foliage with irregular shapes. The specular map specifies specular reflection characteristics of a material. The specular map is used in conjunction with glossiness or roughness maps to control the sharpness or softness of specular highlights. The refraction map defines how light is bent as it passes through a transparent or translucent material. The refraction map is particularly useful for accurately simulating the distortion of light through materials like glass.

Together, the PBR maps factor out the surface properties for application to virtual three-dimensional surfaces. This results in realistic and visually appealing renderings that closely mimic the behavior of light interacting with various materials in the real world. The PBR maps are used in rendering pipelines in multiple applications, including video games, animation, and architectural visualization.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-7.

FIG. 8 depicts a procedure 800 in an example implementation of offsetting camera filter shift. At block 802 a first digital image is captured using a filter at a first position relative to an image capture device 112. In some examples, the filter 114 is a linear polarizer connected to the image capture device 112. Additionally or alternatively, the first digital image is captured under predetermined lighting conditions.

At block 804, a second digital image is captured using the filter 114 at a second position relative to the image capture device 112 resulting from movement of the filter 114 between the first position and the second position. For example, a motor is used to cause the movement of the filter 114.

At block 806, a filter shift 120 is determined resulting from the movement by comparing the first and second digital images. For example, the filter shift 120 is determined by generating a transformation relating the first digital image to the second digital image. Some examples further comprise extracting pixel coordinates and sensor coordinates from the transformation. In some examples, the transformation is generated using an algorithm designed to register images captured under varying lighting conditions.

At block 808, an offset 118 of a portion of the image capture device 112 is controlled based on the filter shift 120. Some examples further comprise capturing an offset digital image 130 based on the offset 118 of the portion of the image capture device 112 and generating at least one physically-based rendering (PBR) map based on the offset digital image 130. In some examples, the offset 118 of the portion of the image capture device 112 is performed using an Optical Image Stabilizer (OIS) 602.

FIG. 9 depicts a procedure 900 in an additional example implementation of offsetting camera filter shift. At block 902, a model is generated comparing a first digital image captured using a filter 114 at a first position relative to an image capture device 112 to a second digital image captured using the filter 114 at a second position relative to the image capture device 112 resulting from a movement of the filter 114 between the first position and the second position. In some examples, the filter 114 is a linear polarizer connected to the image capture device 112. Some examples further comprise using a motor to automatically cause the movement of the filter 114. Additionally or alternatively, the first digital image is captured under predetermined lighting conditions. In some examples, a model is generated using an algorithm designed to register images captured under varying lighting conditions.

At block 904, pixel coordinates and sensor coordinates are extracted from the model.

At block 906, a filter shift 120 is determined resulting from the movement based on the pixel coordinates and the sensor coordinates.

At block 908, an offset 118 of a portion of the image capture device 112 is determined to correct the filter shift 120. Some examples further comprise causing capture of an offset digital image 130 based on the offset 118 of the portion of the image capture device 112 and generating at least one physically-based rendering (PBR) map based on the offset digital image 130. In some examples, the offset 118 of the portion of the image capture device 112 is performed using an Optical Image Stabilizer (OIS) 602.

Example System and Device

FIG. 10 illustrates an example system generally at 1000 that includes an example computing device 1002 that is representative of one or more computing systems and/or devices that implement the various techniques described herein. This is illustrated through inclusion of the offset module 116. The computing device 1002 is configurable, for example, as a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 further includes a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that is configurable as processors, functional blocks, and so forth. This includes implementation in hardware as an application specific integrated circuit or other logic device formed using one or more semiconductors. The hardware elements 1010 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1006 is illustrated as including memory/storage 1012. The memory/storage 1012 represents memory/storage capacity associated with one or more computer-readable media. The memory/storage 1012 includes volatile media (such as random access memory (RAM)) and/or nonvolatile media (such as read only memory (ROM), Flash memory, optical disks, magnetic disks, and so forth). The memory/storage 1012 includes fixed media (e.g., RAM, ROM, a fixed hard drive, and so on) as well as removable media (e.g., Flash memory, a removable hard drive, an optical disc, and so forth). The computer-readable media 1006 is configurable in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1002. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1002, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1010. The computing device 1002 is configured to implement particular instructions and/or functions corresponding to the software and/or hardware modules. Accordingly, implementation of a module that is executable by the computing device 1002 as software is achieved at least partially in hardware, e.g., through use of computer-readable storage media and/or hardware elements 1010 of the processing system 1004. The instructions and/or functions are executable/operable by one or more articles of manufacture (for example, one or more computing devices and/or processing systems 1004) to implement techniques, modules, and examples described herein.

The techniques described herein are supported by various configurations of the computing device 1002 and are not limited to the specific examples of the techniques described herein. This functionality is also implementable through use of a distributed system, such as over a "cloud" 1114 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 include applications and/or data that can be utilized when computer processing is executed on servers that are remote from the computing device 1002. Resources 1018 can also include services provided over the Internet and/or through a subscriber network, such as a cellular or Wi-Fi network.

The platform 1016 abstracts resources and functions to connect the computing device 1002 with other computing devices. The platform 1016 also serves to abstract scaling of resources to provide a corresponding level of scale to encountered demand for the resources 1018 that are implemented via the platform 1016. Accordingly, in an interconnected device embodiment, implementation of functionality described herein is distributable throughout the system 1000. For example, the functionality is implementable in part on the computing device 1002 as well as via the platform 1016 that abstracts the functionality of the cloud 1014.

What is claimed is:

1. A method comprising:
capturing a first digital image using a filter at a first position relative to an image capture device;
capturing a second digital image using the filter at a second position relative to the image capture device resulting from movement of the filter between the first position and the second position;
determining, by a processing device, a filter shift resulting from the movement by comparing the first and second digital images; and

controlling an offset of a portion of the image capture device based on the filter shift.

2. The method of claim 1, further comprising capturing an offset digital image based on the offset of the portion of the image capture device and generating at least one physically-based rendering (PBR) map based on the offset digital image.

3. The method of claim 1, wherein the filter shift is determined by generating a transformation relating the first digital image to the second digital image.

4. The method of claim 3, further comprising extracting pixel coordinates and sensor coordinates from the transformation.

5. The method of claim 3, wherein the transformation is generated using an algorithm designed to register images captured under varying lighting conditions.

6. The method of claim 1, wherein the filter is a linear polarizer connected to the image capture device.

7. The method of claim 1, further comprising using a motor to cause the movement of the filter.

8. The method of claim 1, wherein the first digital image is captured under predetermined lighting conditions.

9. The method of claim 1, wherein the offset of the portion of the image capture device is performed using an Optical Image Stabilizer (OIS).

10. A system comprising:
a memory component; and
a processing device coupled to the memory component, the processing device to perform operations comprising:
generating a model comparing a first digital image captured using a filter at a first position relative to an image capture device to a second digital image captured using the filter at a second position relative to the image capture device resulting from a movement of the filter between the first position and the second position;
extracting pixel coordinates and sensor coordinates from the model;
determining a filter shift resulting from the movement based on the pixel coordinates and the sensor coordinates; and
determining an offset of a portion of the image capture device to correct the filter shift.

11. The system of claim 10, further comprising causing capture of an offset digital image based on the offset of the portion of the image capture device and generating at least one physically-based rendering (PBR) map based on the offset digital image.

12. The system of claim 10, wherein the filter is a linear polarizer connected to the image capture device.

13. The system of claim 10, further comprising using a motor to automatically cause the movement of the filter.

14. The system of claim 10, wherein the first digital image is captured under predetermined lighting conditions.

15. The system of claim 10, wherein the model is generated using an algorithm designed to register images captured under varying lighting conditions.

16. The system of claim 10, wherein the offset of the portion of the image capture device is performed using an Optical Image Stabilizer (OIS).

17. A non-transitory computer-readable storage medium storing executable instructions, which when executed by a processing device, cause the processing device to perform operations comprising:
capturing a first digital image using a filter at a first position relative to an image capture device;

capturing a second digital image using the filter at a second position relative to the image capture device resulting from movement of the filter between the first position and the second position;

determining a filter shift resulting from the movement by comparing the first and second digital images; and controlling an offset of a portion of the image capture device based on the filter shift.

18. The non-transitory computer-readable storage medium of claim 17, further comprising capturing an offset digital image based on the offset of the portion of the image capture device and generating at least one physically-based rendering (PBR) map based on the offset digital image.

19. The non-transitory computer-readable storage medium of claim 17, wherein the filter shift is determined by generating a transformation relating the first digital image to the second digital image and extracting pixel coordinates and sensor coordinates from the transformation.

20. The non-transitory computer-readable storage medium of claim 17, wherein the filter is a linear polarizer connected to the image capture device.

* * * * *